(12) United States Patent
Graham et al.

(10) Patent No.: US 7,654,228 B1
(45) Date of Patent: Feb. 2, 2010

(54) PAW SUCKER

(76) Inventors: Sunny Lyn Graham, 6371 Taylor Rd., Leroy, OH (US) 44077; Vincent Edward Graham, 6371 Taylor Rd., Leroy, OH (US) 44077

(*) Notice: Subject to any disclaimer, the term of this patent is extended or adjusted under 35 U.S.C. 154(b) by 93 days.

(21) Appl. No.: 11/650,136

(22) Filed: Jan. 5, 2007

(51) Int. Cl.
*A01K 13/00* (2006.01)

(52) U.S. Cl. .............. 119/601; 119/603; 119/651; 119/652; 119/665

(58) Field of Classification Search ............ 119/652, 119/673, 650, 651, 600, 601, 602, 603, 604, 119/606, 628, 659, 661, 662, 665, 668, 671, 119/678, 675; D30/158; 601/166, 154, 155, 601/159, 160; 4/594, 622, 516; 15/104.92; 132/270; *A01K 13/00*
See application file for complete search history.

(56) References Cited

U.S. PATENT DOCUMENTS

| | | | | |
|---|---|---|---|---|
| 1,684,047 A | * | 9/1928 | Stoven | 119/673 |
| 3,155,072 A | * | 11/1964 | Owens | 119/673 |
| 3,272,201 A | * | 9/1966 | Burns | 601/166 |
| 3,713,423 A | * | 1/1973 | Sparr, Sr. | 119/670 |
| RE28,405 E | * | 5/1975 | Sullerud | 4/616 |
| 4,020,796 A | * | 5/1977 | Grifa | 119/671 |
| 4,020,856 A | * | 5/1977 | Masterson | 132/74.5 |
| 4,194,262 A | * | 3/1980 | Finley et al. | 15/314 |
| 4,341,183 A | * | 7/1982 | Metzler | 119/671 |
| 4,385,413 A | * | 5/1983 | Goldsmith | 15/322 |
| 4,577,624 A | * | 3/1986 | Patton | 601/166 |
| 4,583,530 A | * | 4/1986 | Henley | 601/158 |
| 5,235,937 A | * | 8/1993 | Farina et al. | 119/664 |
| 5,535,700 A | * | 7/1996 | Boudreau | 119/651 |
| 5,724,918 A | | 3/1998 | Navalon-Chicote | |
| 5,918,323 A | * | 7/1999 | Smith | 4/262 |
| 6,065,431 A | | 5/2000 | Davis | |
| D457,705 S | | 5/2002 | Haslet et al. | |
| 6,439,160 B1 | | 8/2002 | Wheelwright | |

(Continued)

FOREIGN PATENT DOCUMENTS

WO    WO 2004/062357 A1    7/2004

*Primary Examiner*—Son T. Nguyen
*Assistant Examiner*—Shadi Baniani (57) ABSTRACT

The nature of this invention is to develop a new way to clean dog's paws of any debris, such as mud, etc., which it may encounter. The present invention provides a safe, easy, efficient, innovative way to clean the paw. It will eliminate the use of several towels for this purpose and save the life of the owner's carpeting and floors. A main unit (28) will house a rechargeable battery (60); however an ac adapter (52) is also available. Two canisters (20, 24) will provide a container (20) for clean water and a container (24) for dirty, waste water. Each canister is easily removed for filling and cleaning, yet secured onto the main unit via the construction of the molding (90, 92, 94). The paw is placed into a pouch (70). The pouch (70) is secured by means of an elastic band (72). When a spray switch (46) is depressed, water is released through a hose (34) and onto the paw with sufficient pressure to remove debris from the paw. By depressing a suction switch (48), the debris and water are extracted from the pouch (70), through the hose (34), and into the canister (24) designated for this purpose. The paw is taken out of the pouch (70) and the paw is clean and virtually dry. A separate attachment (50) may be used to remove debris or excess water from the animal's body.

5 Claims, 6 Drawing Sheets

U.S. PATENT DOCUMENTS

| | | | |
|---|---|---|---|
| 6,460,191 | B1 | 10/2002 | Lorkovic |
| 6,851,391 | B1 | 2/2005 | Mulich |
| 7,073,226 | B1 * | 7/2006 | Lenkiewicz et al. ........... 15/320 |
| 2002/0112670 | A1 | 8/2002 | Wheelwright |
| 2004/0200432 | A1 | 10/2004 | Hale et al. |
| 2004/0231603 | A1 * | 11/2004 | Bjork et al. ............... 119/14.18 |
| 2005/0011467 | A1 * | 1/2005 | Mulich et al. ............... 119/651 |
| 2005/0086734 | A1 * | 4/2005 | Thies ........................... 4/516 |
| 2005/0224013 | A1 | 10/2005 | Bestelmeyer |
| 2008/0011241 | A1 * | 1/2008 | Farina et al. ................ 119/673 |

* cited by examiner

PAW SUCKER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of Invention

Pets can be great enjoyment for many and excellent companions. However, cleaning a pet, especially the paws on a rainy day, can become quite cumbersome. The paws become the dirtiest because they walk on all sorts of surfaces without protection and often seem to prefer wet, muddy ground. The present invention relates to a cleaning device for animal paws. Moreover, the present invention relates to a device which is safe, efficient, quick and easy for cleaning each paw thoroughly and individually. The device can be easily moved, stored, maintained and operated.

2. Prior Art

Animals' paws often become dirty through contacting various outdoor substances such as mud or dirt. Then, upon reentering a home, the animal tracks the mud or dirt throughout the home. Therefore, it is often necessary to clean animals and their paws before allowing them to reenter the home.

Devices such as the one disclosed in U.S. Pat. No. 6,439,160, have been developed to aid in cleaning animal paws. The devices generally consist of large enclosures which allow animals to be cleaned while containing runoff, waste, and cleaning solutions within the enclosures. These enclosures are typically large basins in which animals place all four paws. Thus, animals must generally be transported to the devices thereby creating a risk that dirt, debris, and waste will be further spread.

Some prior art devices require a variety of mechanical and electrical components to scrub, wash, and clean animals. These mechanical and electrical components further increase the size and weight of the devices. Additionally, because these devices cannot be easily moved, especially when filled with water, a drain must be nearby to dispose of waste and runoff which results from cleaning the animal. Thus, enclosures found in the prior art are generally cumbersome to use, move and store.

In addition, large enclosures, mechanical means for scrubbing, and limited control by users may frighten or threaten the animal in some way making it difficult to contain or control the animal. Such is displayed in prior art devices such as the one disclosed in U.S. Pat. No. 6,065,431, which needs to have the paw physically placed and held onto the unit to utilize the brushes. Although the device is configured to resist tipping, tipping could occur, resulting in a larger mess than only dirty paws. The open-top, bowl configuration also allows for water to be splashed onto the surrounding floor. The complex nature of prior art devices, and their many moving parts, demands that users keep the devices in good working order.

Prior art devices such as the one disclosed in U.S. Pat. No. 6,851,391 B1, needs to have the paw manually agitated within the device. When the paw is removed, the dirty water remains in the device. Therefore in order to clean another paw, the waste water must either be removed or disposed of, and clean, fresh water put in, or the additional paws will be cleaned with the existing muddied water.

3. Objects and Advantages

Accordingly, several objects and advantages of the present invention are the need for an improved device, which is quick, efficient, easy, safe and effective for cleaning an animals' paws, which overcomes the limitations of prior art. A need for an device which can clean a single paw; is inexpensive and easy to use; is portable and easily stored; and provides fresh, clean water for each paw, which is thoroughly contained to avoid any spillage of water, clean or dirty, and still provides an easy and efficient way to dispose of the dirty waste water.

In addition, since this invention is so portable and easy to use, one huge advantage is it can easily be transported in a vehicle. Thus the trips to the beach or a hike through the woods can include the family pet, too, without having to deal with the sand or mud in the family vehicle. Also, with an additional attachment, the animal can have excess water, sand, or mud easily suctioned from the body, thereby eliminating more mess within the home or the vehicle.

Further objects and advantages of my invention will become apparent from a consideration of the drawings and ensuing description.

SUMMARY OF THE INVENTION

The present invention solves the above described problems and provides a distinct advance in the art of cleaning devices for animal paws, with added advantages. The present invention is a device which would be readily accessible when your dog comes in with muddy paws. The device broadly includes a latex-type pouch which slips over the dog's paw. This will be comfortably, yet snuggly, secured with elastic around the dog's lower leg to contain a liquid and to avoid any leakage. The latex pouch is flexible to allow room to spare from the tiniest of paws to the largest. The paw is inserted into the pouch. The toggle switch allows clean water from one canister to spray onto the paw. The other toggle switch then allows the dirtied water be suctioned off the paw, and extracted down a discharge hose into a waste canister. If the animal has excess water on the body, the pouch can be easily removed and replaced with the attachment to suction off this water, etc. The waste water tank is easily removed for disposal of the dirtied water.

BRIEF DESCRIPTION OF THE SEVERAL VIEWS OF THE DRAWING

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
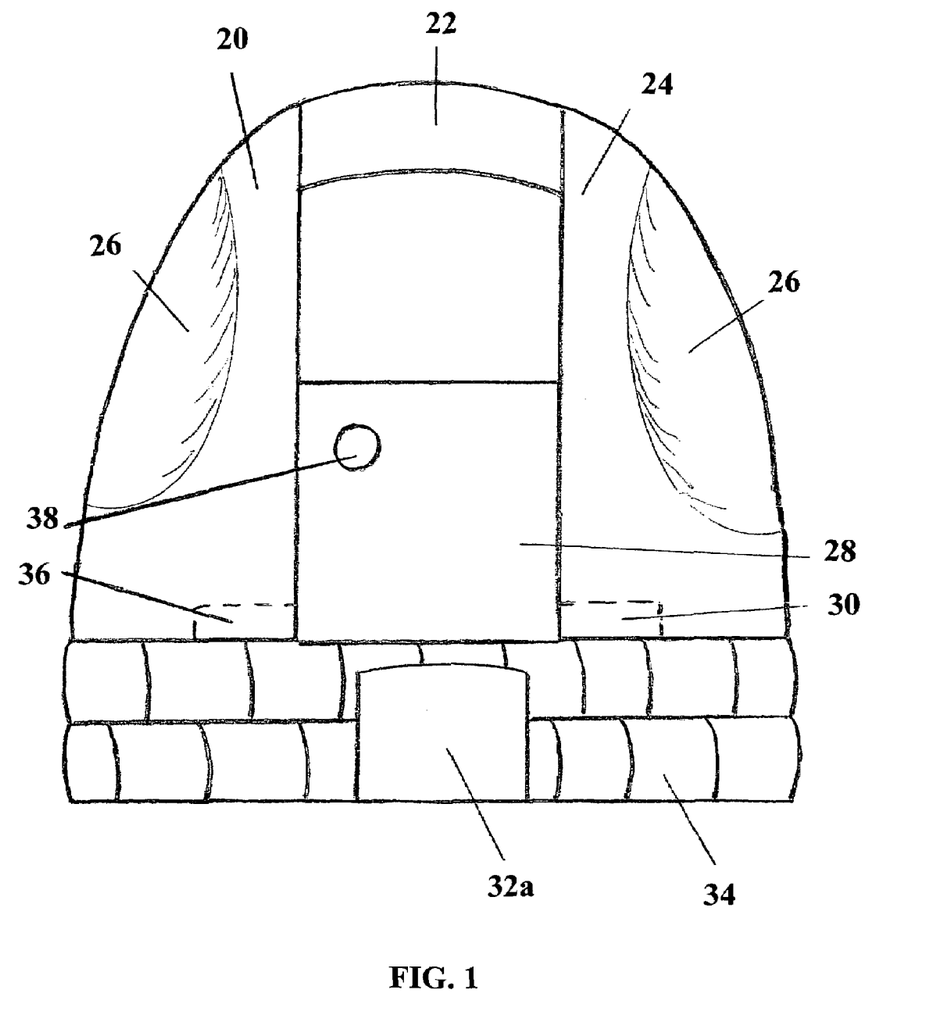
FIG. 1 is a perspective view of an embodiment of the present invention viewing from the front.

Turning now to the drawing figures and particularly FIG. 1, which is an overall front view of the device for cleaning an animal's paw. Wherein, a body 28 of the device will house a motor. The body would preferably be constructed of a durable, light-weight plastic, or stainless steel, sturdy enough to securely encompass the motor. The encased motor will generate sufficient RPM's at appropriate power levels to perform as desired and is an appropriate size.

Two clear canisters 20, 24 comprise the outer part of the main unit. These two canisters rest securely in the base of the main unit. The canister 20 will be designed to hold the clean water. The canister 24 will be designed to hold the dirty waste water. Each canister will presently be preferred to be made of a light-weight, plastic, which is rigid and capable of retaining a liquid. The canisters 20, 24 will be transparent so an operator of the present invention can see both water levels. In another embodiment, some sort of electronic on/off indicator may be used when the canisters are empty and full. A valve 36 will allow the water to be pumped out of the canister 20 and into an expandable hose 34. An additional valve 30 will allow the waste water to be dispensed into the canister 24. Each canister 20, 24 will have a recessed indention 26 for easy handling.

The hose 34 will be a flexible, expandable material, preferably rubber or a plastic material sturdy enough to withstand the water pressure forced through it. The hose 34 will be a length suitable for easy access, yet also a length which can be easily and conveniently stored on present device. Clips 32a, 32b, 32c will keep the hose 34 secured when not in use.

The present invention can be selectively turned on and off with a toggle switch 38 mounted on the main body of the device. Switch 38 can be virtually any type of well known toggle switches, and it has been found that a simple rocker type or toggle type on/off switch is satisfactory.

The present invention will be easily transported by use of a handle 22. The handle will be located between the walls of the main unit which enclose the body. The handle 22 will preferably be a sturdy plastic, covered with a foam-type material for comfortable, slip-free handling.

Figure 2:
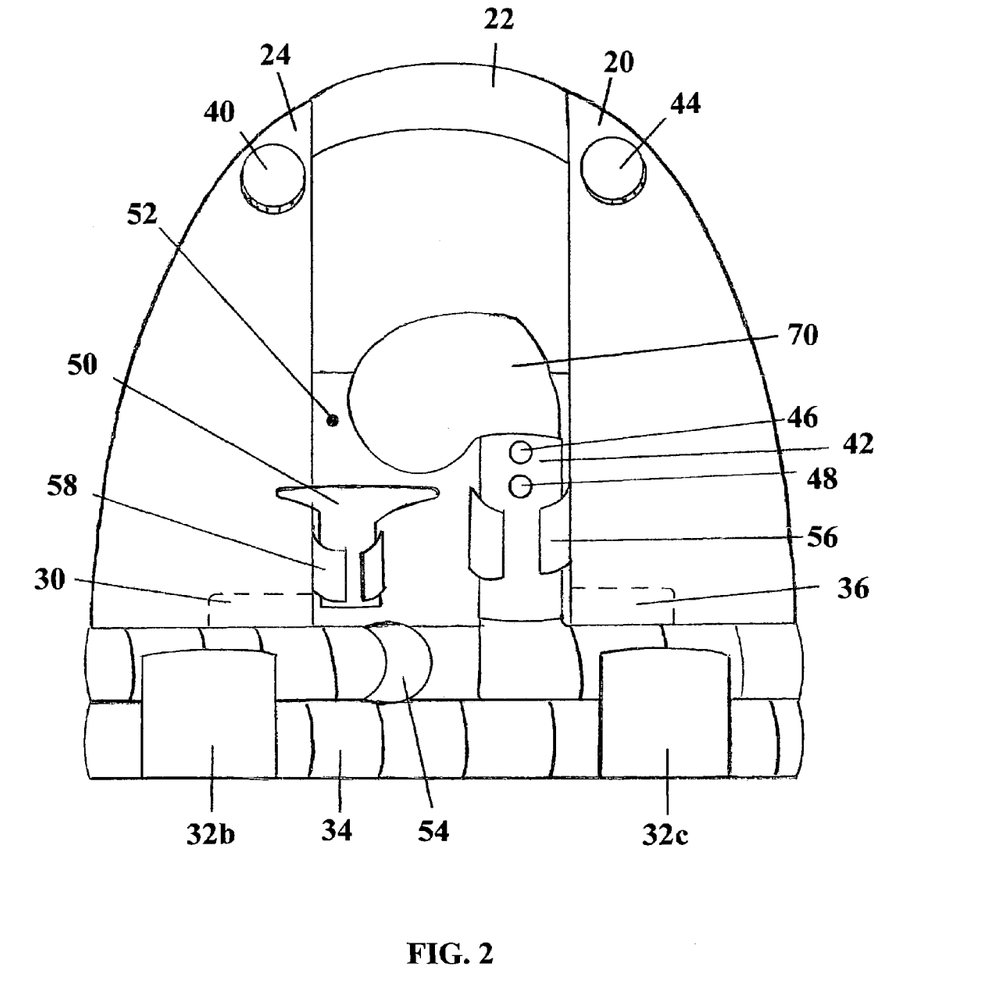
FIG. 2 is a perspective view of an embodiment of the present invention viewing from the back.

Now turning to the drawing figure, particularly FIG. 2, which represents the rear view of the device for cleaning animal paws. The main body will be home to two clips 56, 58. Clip 56 will securely and conveniently hold the cylindrical handle 42 when not in use. Two switches 46, 48 are located on the handle for performing the spray and suction function, respectively. Attached to the open end of the handle is a pouch 70. Clip 58 will securely and conveniently hold an attachment 50 when not in use. Each canister 20, 24 will have a removable cap 40, 44. The caps will either securely screw on and off, or snap on and off. A spherical hose connection 54 allows the hose 34 to rotate for easy access to the paws.

Figure 3:
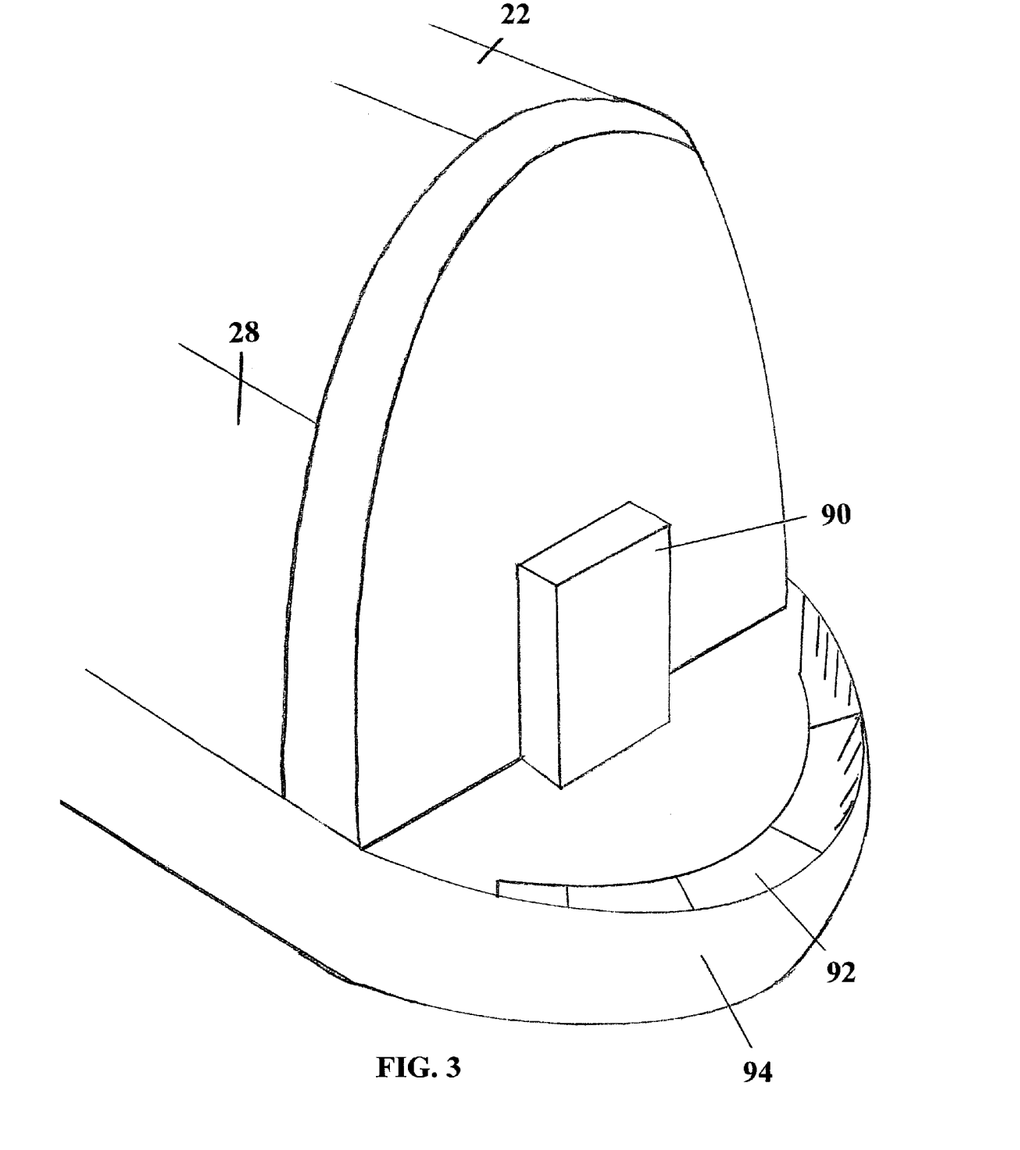
FIG. 3 is an enlarged view of the side of the present invention, showing the configuration for containing the canisters.

FIG. 3 illustrates a cutaway view of the side of the present invention. An extended molded piece 90 on the main unit slides into a molded recessed indent of equal proportions to secure the canisters 20, 24. A perforated edge 92 on the base of the main unit supplies additional security in locking in place the canisters 20, 24 which bottom edge is molded in perfect proportion to slide into these openings. A raised edge 94 further secures the canisters stay locked in place.

Figure 4:
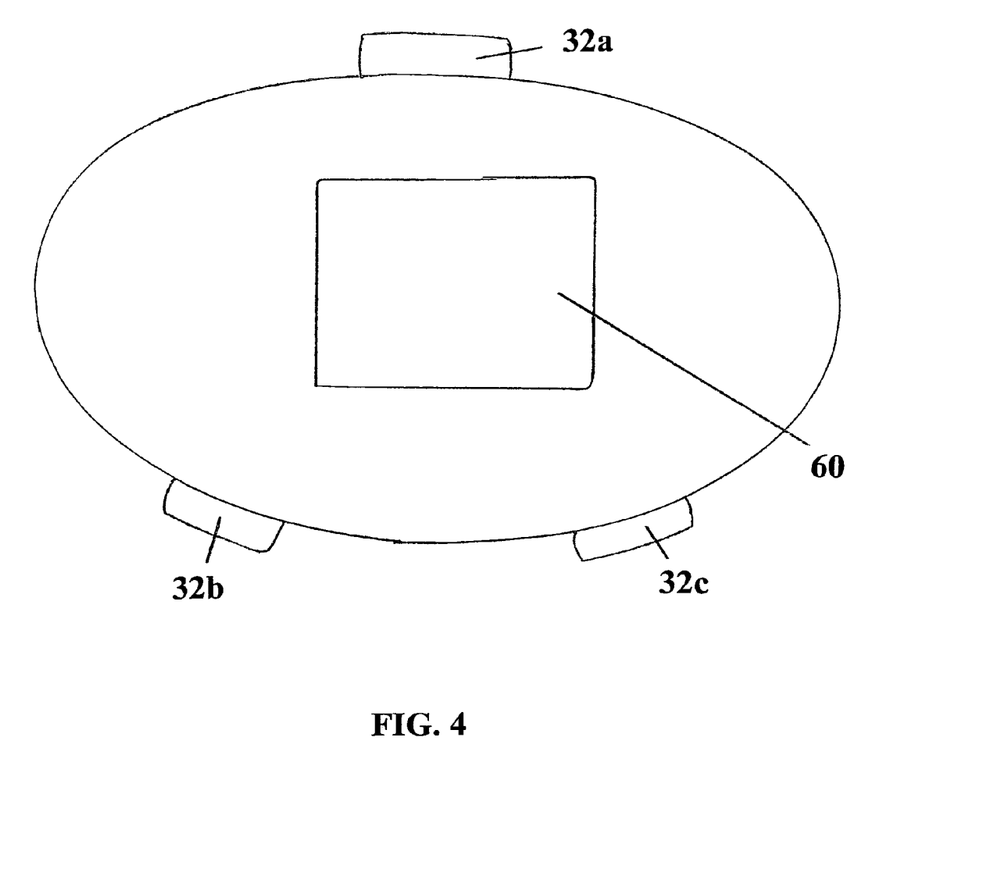
FIG. 4 is a perspective view of an embodiment of the present invention viewing from the bottom.

Another embodiment as shown in FIG. 4 reveals the bottom of present invention. The preferred embodiment of the invention operates by battery power. A rechargeable battery 60 would be inserted in the bottom of the main unit. However, if made safely and reliably, the device may be operable by ac power in a fashion which is well known to those of ordinary skill. A plug 52, FIG. 2 will be provided on the rear of the main unit. In fact, in one preferred embodiment, the device includes a rechargeable battery, which battery can include a feature preventing device from operating when battery is connected to ac current, to ensure maximum safety.

Figure 5:
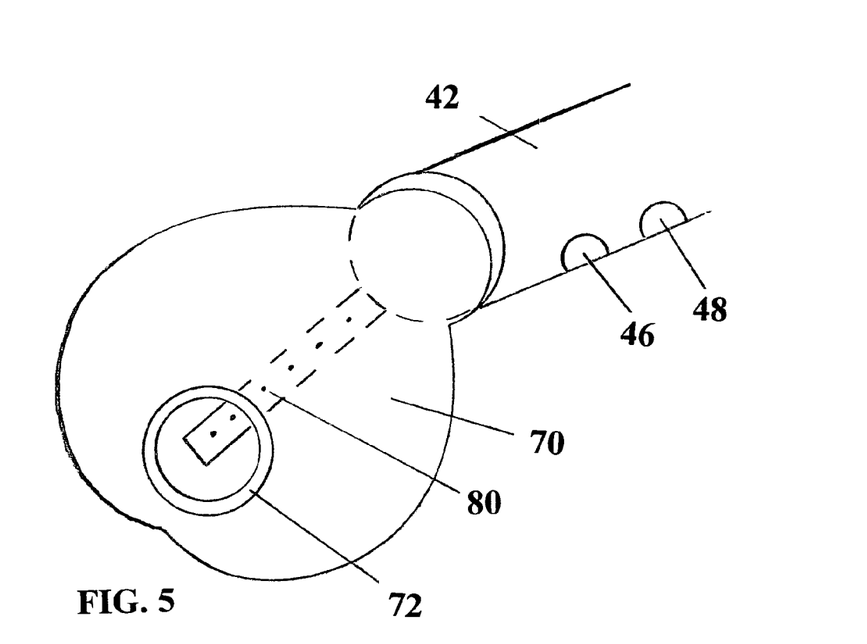
FIG. 5 is a view in detail of the portion indicated by the section lines 42-70 in FIG. 2.

FIG. 5 illustrates an exploded view of cylinder 42, FIG. 2. Toggle switches 46, 48 are for the spray and suction functions, respectively. A flexible pouch 70 is mounted onto the handle 42. The pouch 70 is preferably made of a latex material, which is flexible and expandable, yet durable and not easily torn. The pouch 70 has an elastic ring 72 opening on one end and will securely snap into place on the handle 42 on the other end.

Figure 6:
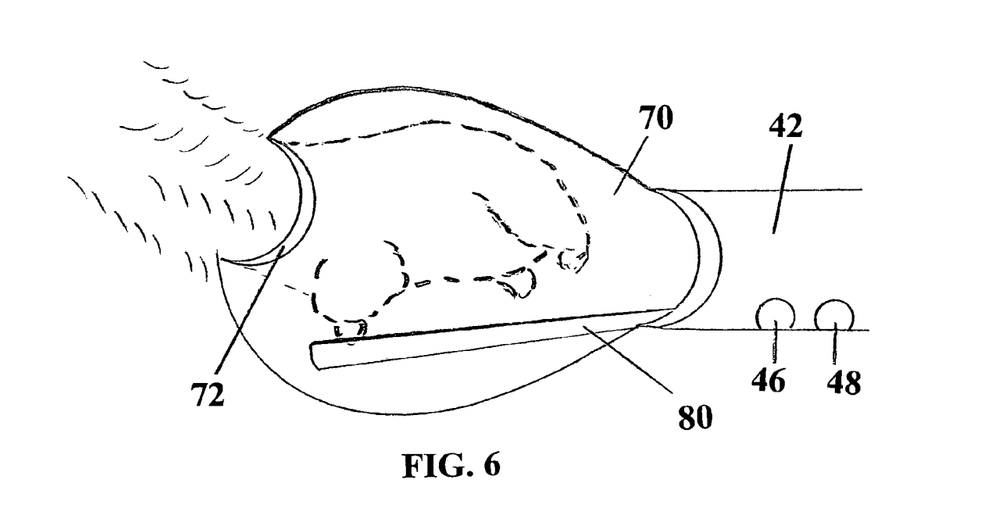
FIG. 6 is a cutaway view of FIG. 5.

FIG. 6 of the embodiment illustrates an exploded, cutaway view of the cylinder 42. A wand 80 is enclosed in the pouch 70 which will contain several spray nozzles.

Figure 7:
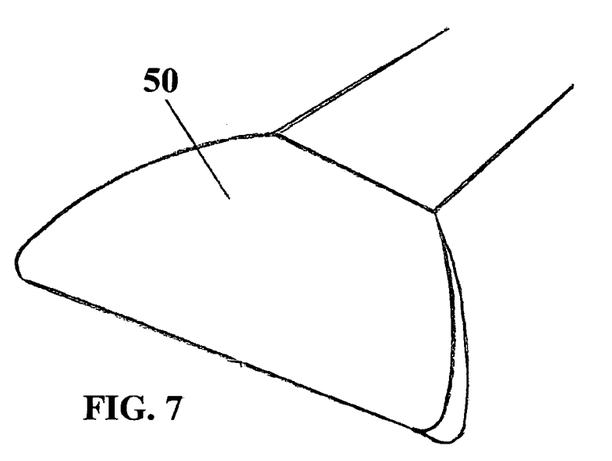
FIG. 7 is a view in detail of the attachment in FIG. 2.

FIG. 7 illustrates an exploded view of the attachment 50, FIG. 2, which is an additional feature. This attachment can be interchanged with the pouch 70 by snapping it onto or sliding into the handle 42. The attachment will preferably be made of a sturdy plastic. The attachment will preferably be approximately 3 inches in length with an opening of approximately a quarter inch.

Figure 8:
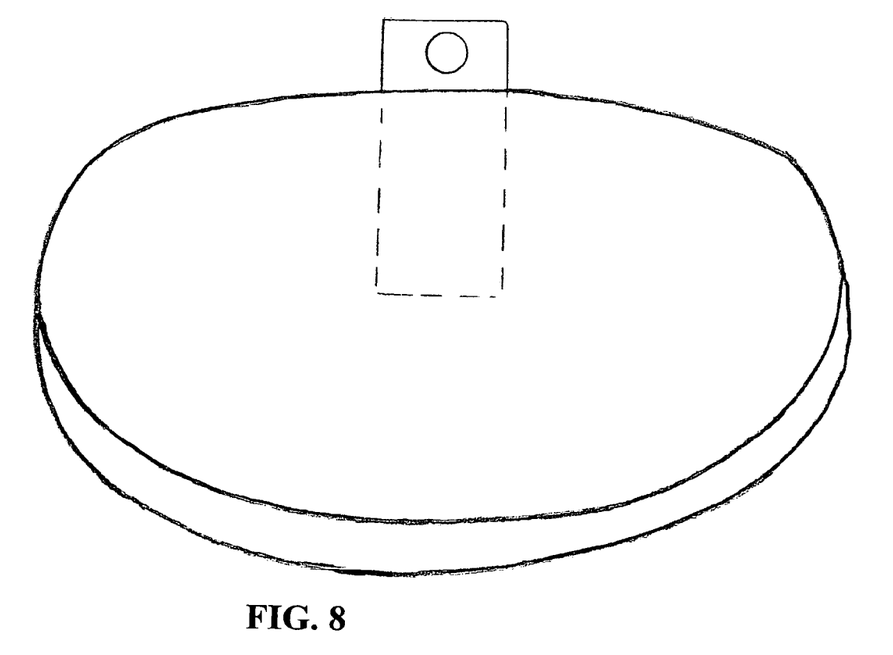
FIG. 8 is a perspective view of a device derived to hold said present invention.

FIG. 8 illustrates an optional wall mount.

In operation of the present invention the canisters 20, 24 will be stored on either side of the unit; one for clean water 20, the other for dirty water 24. These canisters 20, 24 will be easy to remove due to the recessed indents 26 and will easily snap back into place as shown by the configuration in FIG. 3. The power will be maintained by a rechargeable battery 60 and/or an electric plug via an ac adapter plug 52. A retractable hose 34 will fit snuggly into the main unit when not in use, via clips 32a, 32b and 32c. The present invention will have an easily accessible handle 22 which will be made of a comfortable, non-slip material. This will aid in transporting the device, if necessary. Two switches 46, 48 will operate the flow of water and the suctioning out of the water. When not in use, the cylinder 42 will be secured to the main unit via a clip 56 and the attachment 50 will be secured via clip 58.

When the animal enters the home or before entering the vehicle, a latex, or similar material, pouch 70 will slide over the paw. The end of this pouch will have an elastic band 72, which will fit snuggly around the lower leg of the dog. This will avoid any spillage of the water. This pouch 70 will also be replaceable. The unit is turned on by the toggle switch 38. By pressing the spray switch 46, water is extracted from canister 20 through valve 36. The water will travel through hose 34 and will then be exerted into the pouch 70 through the wand 80 and spray onto the paw. After the paw is sufficiently cleaned, the suction switch 48 will be pressed and the muddy water will be suctioned off the paw and out of the pouch 70. The waste water will be deposited through the valve 30 and into the retaining canister 24. This will leave the paw clean and mostly, if not completely dry. The retaining tank 24 can easily be emptied by lifting it out of the base of the main unit and opening cap 44. Also, the canister 20 can be easily filled by lifting it out of the base of the main unit and opening cap 40. Both canisters 20, 24 will be a transparent material, so no mistake will be made in overfilling or running out of water in the clean canister 20 or overfilling the waste canister 24. Due to the nature of the spherical hose connection 54, the hose will not easily become tangled in any way.

In addition, an attachment 50 will be available to simply suction off excess water/mud/sand from the animal's body. This feature and the fact the device is light-weight and portable, makes the device easy to transport from house to vehicle and back again or virtually anywhere the animal may go.

The device will be compact enough to either hang on the wall, platform included, FIG. 8, or set on a shelf.

As one can see from the description above, a number of advantages of my animal paw cleaner become evident:

(a) This is a unique way to clean your dog's paws, which in turn will save time, money, and energy, in lieu of using several towels to try to accomplish the same task. Also, this device will aid in saving and extending the life of the carpeting in your home and/or the seats in your vehicle;

(b) This is a safe and efficient way to clean the paw. No mess will result from using this present invention, due to the unique configuration, which fully contains all liquids being used;

(c) The device is light weight and easy to transport;

(d) Little maintenance is needed to keep the present invention operational;

(e) The canisters are easy to access, remove and clean or fill;

(f) The device is portable and easily stored in a convenient, accessible location when not in use;

(g) The present invention is extremely easy to use;

(h) The present invention is safe, comfortable, and unobtrusive for all animals.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

The invention claimed is:

1. A method of cleaning a pet's paw comprising the steps of:

providing a main unit; a first canister secured to said main unit for holding clean water, said first canister includes a cap for filling and emptying said first canister; a second canister secured to said main unit for holding dirty water, said second canister includes a cap for filling and emptying said second canister; a hose connected to said main unit at a first end, said hose includes a spherical hose connection to allow said hose to rotate in any direction; a cylinder having ends, wherein said hose is attached to said cylinder at one of said ends; a pouch connected to said hose at a second end, said pouch including an opening for receiving said pet's paw; said pouch is attached to one of said ends of said cylinder, said pouch is removable for disposability and replacement; an elastic ring positioned at an end of said pouch wherein said elastic ring is sized and configures to receive said paw and substantially seal to the lower leg of said pet to prevent any leakage; a wand including a plurality of holes in said pouch; a first valve connected to said first canister, wherein said first valve extracts water at a predetermined pressure sufficient to dislodge dirt and debris from said pet's paw; a second valve connected to said pouch, wherein said second valve allows water to be suctioned out of the pouch at a predetermined pressure and traveled through said hose and into said second canister; a motor carried by said main unit; dual switches to control said spray and suction functions; a single on/off switch to operate said unit;

inserting said pet's paw into the pouch;

substantially sealing the pouch around said pet's leg; with said pet's paw inserted into said pouch;

and wherein said pouch substantially sealed around said pet's paw, spraying water onto said paw at a pressure sufficient to dislodge dirt from said pet's paw; and with said pet's paw inserted into pouch, suctioning water and debris off of said paw.

2. The method of claim 1, wherein said inserting the pet's paw into the pouch further comprising inserting the pet's paw into the pouch through the elastic ring substantially sealing the pouch against the pet's leg, and spraying water onto the paw further comprising spraying water onto the bottom of the paw at a pressure sufficient to dislodge dirt from the pet's paw.

3. The method of claim 2, wherein the pouch includes a flexible material.

4. The method of claim 3, wherein said wand is disposed in a lower section of said pouch and the opening in the pouch is disposed above said wand such that when the pet's paw is inserted into said pouch water traveling out through the hole in said wand directly contacts the bottom of the pet's paw.

5. The method of claim 4, wherein said wand is positioned with respect to the opening such that when an pet's paw is not in said pouch, water traveling out through the hole in said wand at a pressure sufficient to dislodge dirt from said pet's paw exit said pouch through said opening.

\* \* \* \* \*